US012572591B2

(12) United States Patent
Sarti et al.

(10) Patent No.: US 12,572,591 B2
(45) Date of Patent: Mar. 10, 2026

(54) SYSTEMS AND METHODS FOR PROVIDING QUERY-BASED TRIGGERS IN REAL-TIME VIDEOS ASSOCIATED WITH A VEHICLE

(71) Applicant: Verizon Patent and Licensing Inc., Basking Ridge, NJ (US)

(72) Inventors: Leonardo Sarti, Florence (IT); Aurel Pjetri, Florence (IT); Andrea Benericetti, Prato (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/790,562

(22) Filed: Jul. 31, 2024

(65) Prior Publication Data

US 2026/0037576 A1 Feb. 5, 2026

(51) Int. Cl.
*G06F 16/70* (2019.01)
*G06F 16/783* (2019.01)
*G06F 16/787* (2019.01)

(52) U.S. Cl.
CPC ........ *G06F 16/7844* (2019.01); *G06F 16/787* (2019.01)

(58) Field of Classification Search
CPC .......................... G06F 16/7844; G06F 16/787
See application file for complete search history.

(56) References Cited

U.S. PATENT DOCUMENTS

| | | | | | |
|---|---|---|---|---|---|
| 11,468,677 | B2 * | 10/2022 | Zadeh | .................. | G06F 16/738 |
| 11,594,042 | B1 * | 2/2023 | Sarti | ...................... | G06V 20/41 |
| 2023/0274555 | A1 * | 8/2023 | Simoncini | ........... | G06V 10/764 |
| | | | | | 382/103 |

OTHER PUBLICATIONS

Hu et al., PromptCap: Prompt-Guided Task-Aware Image Captioning, Mar. 28, 2023 [retrieved May 2, 2025]. Retrieved from the Internet: https://arxiv.org/abs/2211.09699v3 (Year: 2023).*

* cited by examiner

*Primary Examiner* — Kristopher Andersen

(57) ABSTRACT

A device may receive a query identifying one or more events to be captured by a camera associated with a vehicle, video data associated with the vehicle, and location data associated with the vehicle, and may generate a prompt requesting captions of video frames included in the video data. The device may process the video data, with a large language model and based on the prompt, to generate the captions of the video frames included in the video data, and may process the query and the captions, with a phrase model, to determine categories of words provided in the query and the captions. The device may calculate matching scores between the query and the captions based on the categories of words and a dictionary of words, and may identify an event based on the matching scores. The device may perform one or more actions based on the event.

20 Claims, 11 Drawing Sheets

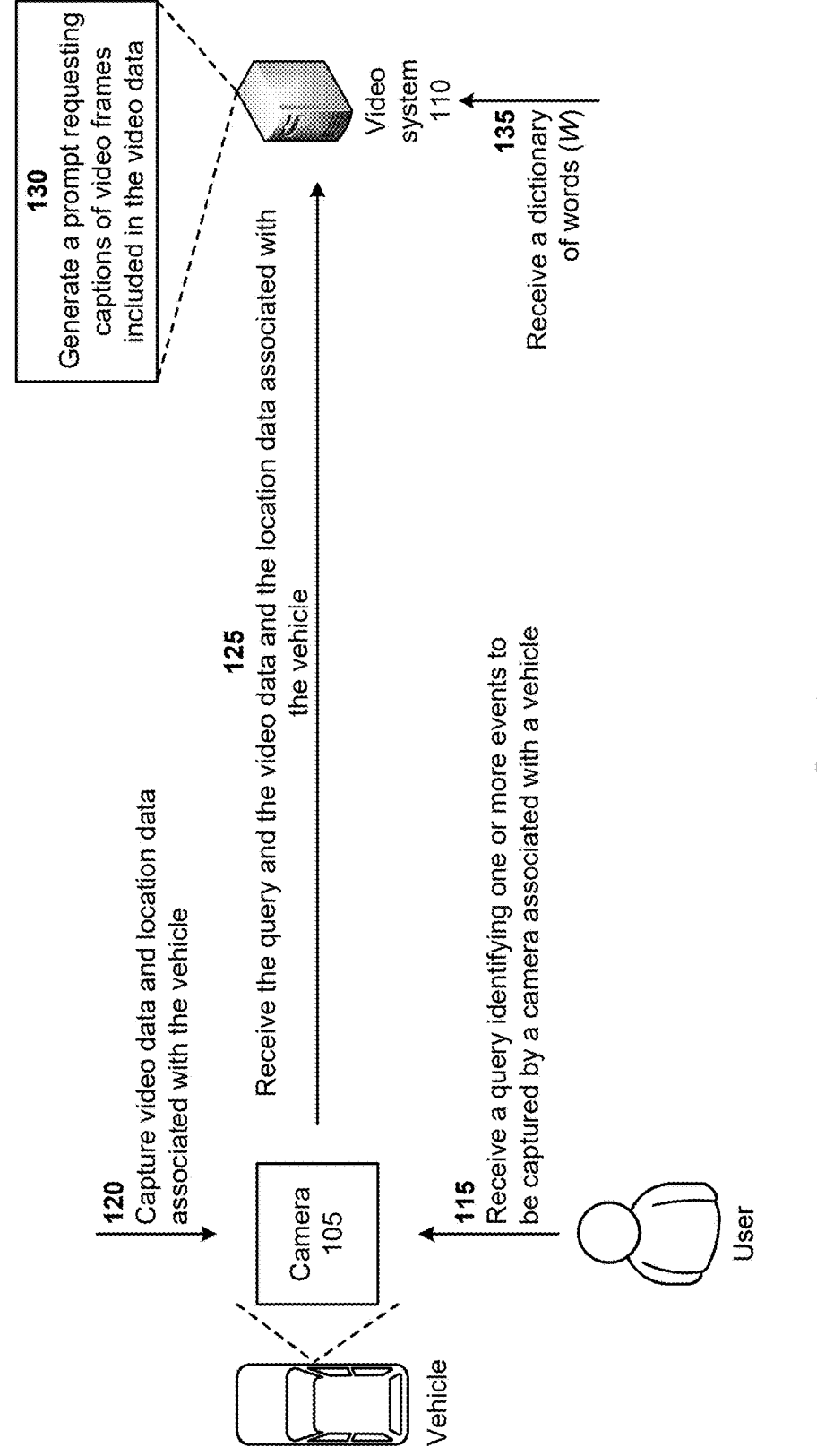

130
Generate a prompt requesting captions of video frames included in the video data Video system
110

135
Receive a dictionary of words (W)

125
Receive the query and the video data and the location data associated with the vehicle

120
Capture video data and location data associated with the vehicle

Camera
105

115
Receive a query identifying one or more events to be captured by a camera associated with a vehicle Vehicle User

140
Process the video data, with a large language model (LLM) and based on the prompt, to generate the captions (C) of the video frames included in the video data Captions Large language model Prompt Video data Video system 110

100

100

155

Calculate the matching scores between the query (Q) and the captions (C) based on the categories of words, the dictionary of words, and the location data associated with the vehicle Matching scores Calculate matching scores Video system 110

Categories of words

Dictionary of words

Location data

100

160

Identify an event, of the one or more events associated with the vehicle, based on the matching scores and one or more thresholds Event Identify an event Video system 110

Matching scores

Thresholds

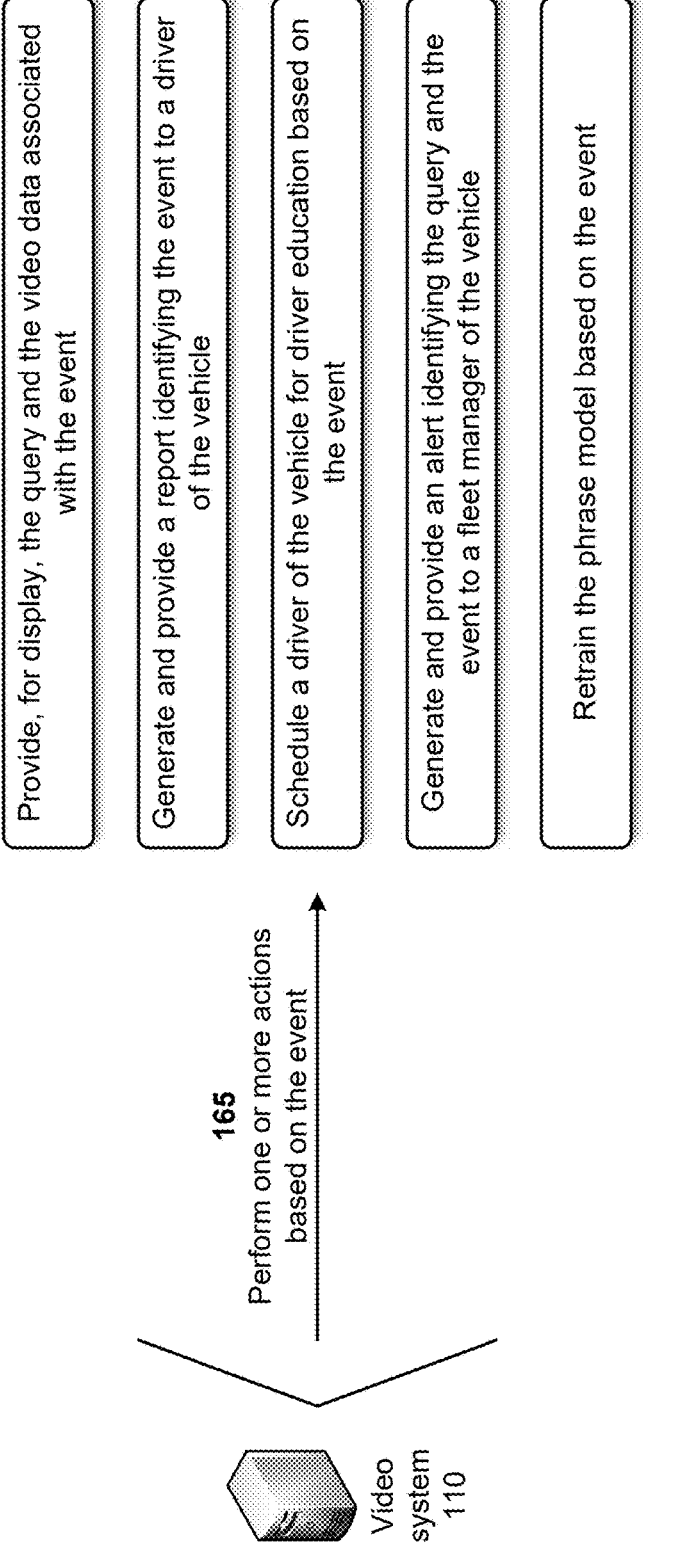

165
Perform one or more actions based on the event

Provide, for display, the query and the video data associated with the event

Generate and provide a report identifying the event to a driver of the vehicle

Schedule a driver of the vehicle for driver education based on the event

Generate and provide an alert identifying the query and the event to a fleet manager of the vehicle Retrain the phrase model based on the event Video system 110

FIG. 1G

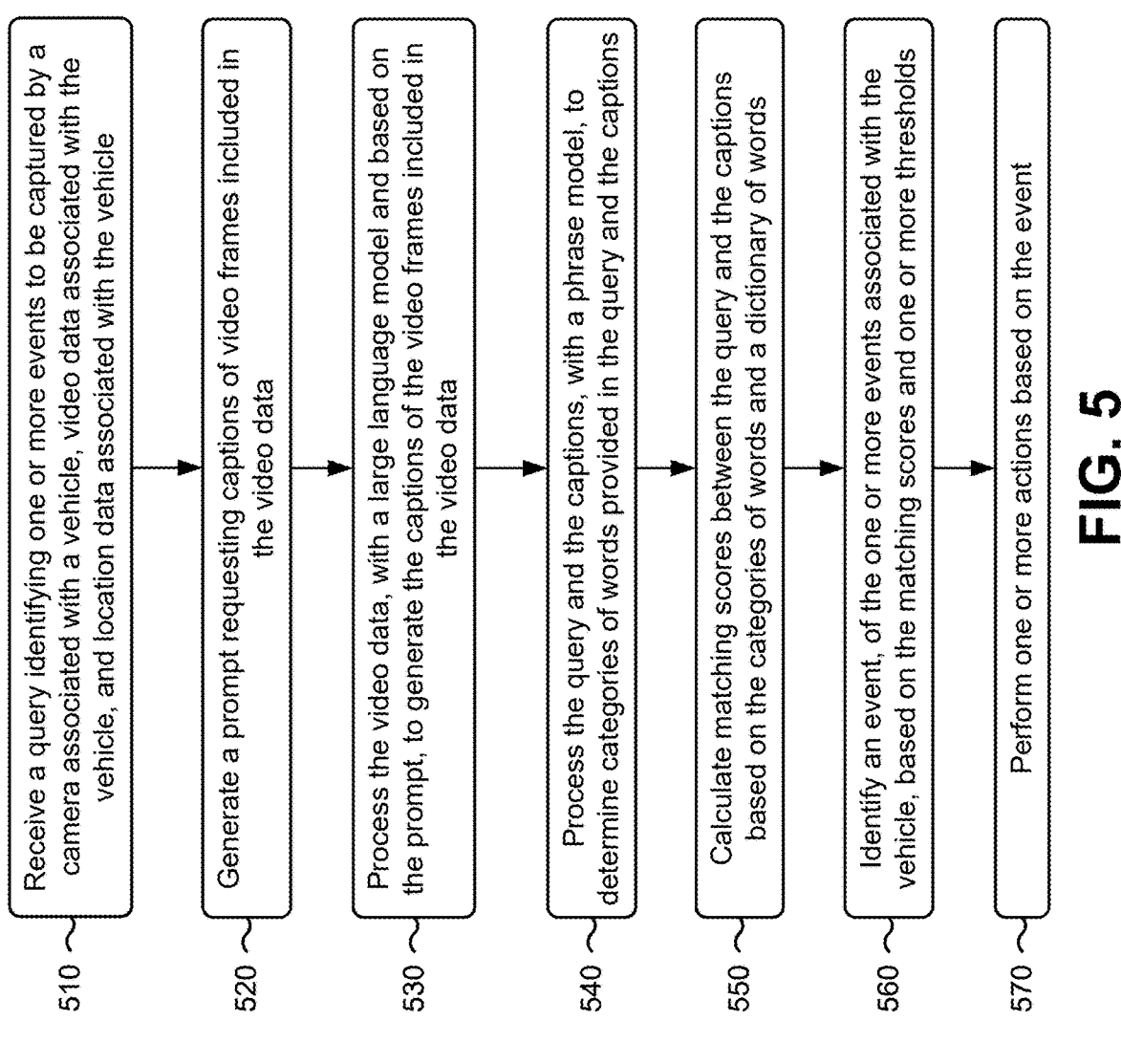

500

510 — Receive a query identifying one or more events to be captured by a camera associated with a vehicle, video data associated with the vehicle, and location data associated with the vehicle 520 — Generate a prompt requesting captions of video frames included in the video data 530 — Process the video data, with a large language model and based on the prompt, to generate the captions of the video frames included in the video data 540 — Process the query and the captions, with a phrase model, to determine categories of words provided in the query and the captions 550 — Calculate matching scores between the query and the captions based on the categories of words and a dictionary of words 560 — Identify an event, of the one or more events associated with the vehicle, based on the matching scores and one or more thresholds 570 — Perform one or more actions based on the event

FIG. 5

SYSTEMS AND METHODS FOR PROVIDING QUERY-BASED TRIGGERS IN REAL-TIME VIDEOS ASSOCIATED WITH A VEHICLE

BACKGROUND

Provision of dashcams in vehicles has become increasingly common, with both enterprise fleets and private vehicle owners using these cameras to record hours of driving footage. Dashcam systems often include both forward or front facing cameras (FFCs) capturing a road ahead of a vehicle and driver-facing cameras (DFCs) capturing a cabin of the vehicle.

BRIEF DESCRIPTION OF THE DRAWINGS

FIGS. 1A-1G are diagrams of an example associated with providing query-based triggers in real-time videos associated with a vehicle.

FIG. 5 is a flowchart of an example process for providing query-based triggers in real-time videos associated with a vehicle.

DETAILED DESCRIPTION OF EXAMPLE EMBODIMENTS

Figure 1B:
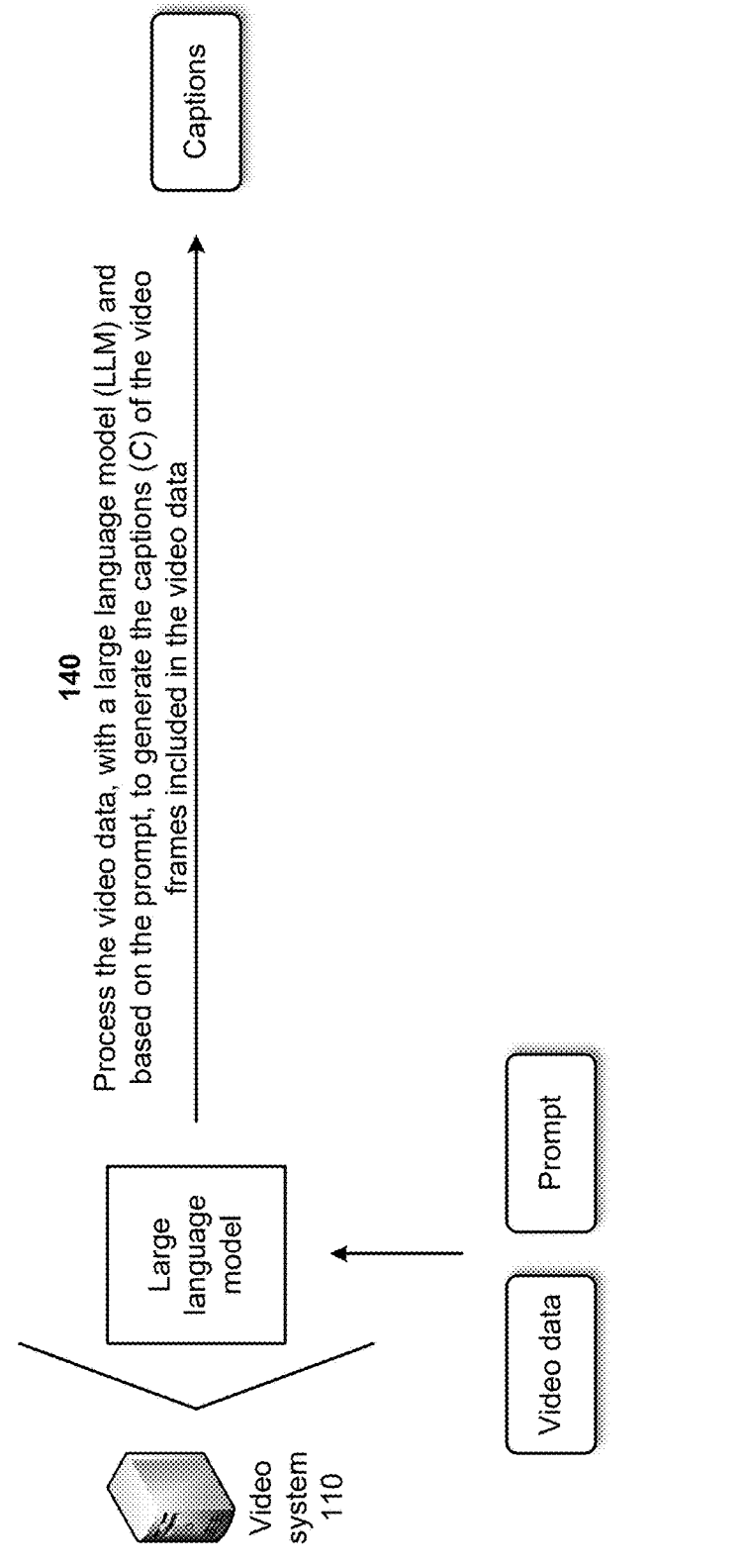

The following detailed description of example implementations refers to the accompanying drawings. The same reference numbers in different drawings may identify the same or similar elements.

In commercial fleet management, dashcams may be used to detect and record significant occurrences, such as traffic violations, unsafe driving techniques, and/or the like. While modern dashcams include sensors and artificial intelligence capabilities, enabling them to trigger capture of driving events based on detected activities, these features are static and confined by the limitations of the pre-installed artificial intelligence (AI) models. Current dashcam systems do not offer users the flexibility to modify or augment the triggering of driving events to capture without an extensive overhaul or reprogramming of the AI models, which is time-consuming and technically demanding. Thus, current techniques for triggering capture of driving events based on vehicle videos consume computing resources (e.g., processing resources, memory resources, communication resources, and/or the like), networking resources, and/or other resources associated with handling mental health issues associated with failing to enable customization of driving events that trigger vehicle video data capture, capturing and storing vehicle video data that is useless to a user (e.g., a fleet manager), failing to identify poor drivers based on failing to enable customization of driving events that trigger vehicle video data capture, and/or the like.

Some implementations described herein provide a video system that provides query-based triggers in real-time videos associated with a vehicle. For example, the video system may receive a query identifying one or more events to be captured by a camera associated with a vehicle, video data associated with the vehicle, and location data associated with the vehicle, and may generate a prompt requesting captions of video frames included in the video data. The video system may process the video data, with a large language model (LLM) and based on the prompt, to generate the captions of the video frames included in the video data, and may process the query and the captions, with a phrase model, to determine categories of words provided in the query and the captions. The video system may calculate matching scores between the query and the captions based on the categories of words and a dictionary of words, and may identify an event, of the one or more events associated with the vehicle, based on the matching scores and one or more thresholds. The video system may perform one or more actions based on the event.

In this way, the video system provides query-based triggers in real-time videos associated with a vehicle. For example, the video system may receive a free-text query specifying particular event criteria, video data from a camera associated with a vehicle, and geolocational data contextual to the video data. The video system may generate prompts that solicit captions for video frames of the video data from an LLM, and may categorize words from the query and the captions. The video system may calculate matching scores between the query and the captions based on the categories and a predefined dictionary, may identify an event when the matching scores surpass certain thresholds, and execute predetermined actions relevant to the identified event. By delivering a customizable triggering mechanism for dashcam events based on dynamic, free-text queries, the video system mitigates the resource usage associated with constantly retraining AI models for new event types. Thus, the video system may conserve computing resources, networking resources, and/or other resources that would have otherwise been consumed by failing to enable customization of driving events that trigger vehicle video data capture, capturing and storing vehicle video data that is useless to a user (e.g., a fleet manager), failing to identify poor drivers based on failing to enable customization of driving events that trigger vehicle video data capture, and/or the like.

FIGS. 1A-1G are diagrams of an example 100 associated with providing query-based triggers in real-time videos associated with a vehicle. As shown in FIGS. 1A-1G, example 100 includes a camera 105 associated with a vehicle and a video system 110. The camera 105 may capture video of objects (e.g., pedestrians, traffic signs, traffic signals, road markers, a driver, animals, and/or the like) associated with the vehicle. The camera 105 may include a dashcam of the vehicle, a forward-facing camera of the vehicle, a driver-facing camera of the vehicle, a side camera of the vehicle, a rear camera of the vehicle, and/or the like. The video system 110 may include a system that receives and processes video data generated by the camera 105 and sensor data generated by the vehicle. Further details of the camera 105, the vehicle, and the video system 110 are provided elsewhere herein. Although implementations described herein depict a single vehicle, in some implementations, the video system 110 may be associated with multiple vehicles. Furthermore, the implementations described herein as being performed by the video system 110 may alternatively, or additionally, by performed by the vehicle and/or the camera 105.

As shown by FIG. 1A, and by reference number 115, the camera 105 may receive a query identifying one or more events to be captured by the camera 105 associated with the vehicle. For example, the camera 105 may be equipped with input functionality allowing a user to provide the query identifying the one or more events to be captured by the camera 105. In some implementations, the query may include free-text information, structured sentences, a list of keywords, a list of phrases, and/or the like associated with events to be extracted from recorded video footage. The user may provide the query to the camera 105 or the video system 110, and the video system 110 may identify video data (e.g., captured by the camera 105) that is associated with the query. For example, if the user is interested in capturing video with animals, the user may provide a query (e.g., "animal crossing the road") in a text field to cause the video system 110 to identify video frames associated with an animal crossing the road near the vehicle. In some implementations, the user may input the query in an input text field of a camera settings page associated with the camera 105. In some examples, the query may include text, such as "a deer on the side of the road," "a postal service truck," "a gas station," "an ambulance," "a yellow car," "a trash container," and/or the like.

In some implementations, the camera 105 may identify specific events of interest provided in the query, and the video system 110 may process video data captured by the camera based on the query and using pre-existing models without a need for retraining, thereby providing a customized trigger based on user preference. Additionally, or alternatively, the camera 105 may be configured to interpret vocal commands or signals. These vocal commands can be in the form of the query (e.g., structured sentences or lists of keywords), and may ensure that the user can provide the query effortlessly, thus streamlining the event capturing process based on voice recognition technology.

As further shown in FIG. 1A, and by reference number 120, the camera 105 and/or the vehicle may capture video data and location data associated with the vehicle. For example, the camera 105 associated with the vehicle may continuously capture the video data associated with the vehicle experiencing one or more events. The vehicle may also be associated with a global positioning system (GPS) sensor that captures locations (e.g., location data) of the vehicle experiencing the one or more events. In some implementations, the video system 110 may receive the query when the query is input to the camera 105 and/or the video system 110 by the user. In some implementations, the camera 105 and/or the vehicle may periodically capture the video data associated with the vehicle experiencing the one or more events and the location data of the vehicle experiencing the one or more events, may continuously capture the video data and the location data, may capture the video data and the location data based on a request to capture the video data and the location data, and/or the like.

In some implementations, integrated systems of the vehicle, in conjunction with the camera 105, may record video footage (e.g., the video data) associated with the vehicle and may acquire geographical positioning information (e.g., the location data), thereby providing a comprehensive set of visual and locational contexts for any event detected. Additionally, or alternatively, the vehicle may include sensors that provide supplementary data, such as a speed or a direction of the vehicle. The supplementary data may enrich event analysis, and may provide a multidimensional view of circumstances captured by the video data, which may be utilized to understand dynamics of events.

As further shown in FIG. 1A, and by reference number 125, the video system 110 may receive the query as well as the video data and the location data associated with the vehicle. For example, the video system 110 may receive the query directly from the user, from the camera 105, and/or from the vehicle. In some implementations, the video system 110 may receive the query when the query is input to the camera 105 and/or the video system 110 by the user. The video system 110 may also receive the video data captured by the camera 105 and the location data captured by the GPS sensor of the vehicle. In some implementations, the video system 110 may periodically receive the video data associated with the vehicle experiencing the one or more events and the location data of the vehicle experiencing the one or more events, may continuously receive the video data and the location data, may receive the video data and the location data based on requesting the video data and the location data from the camera 105 and/or the vehicle, and/or the like. Additionally, or alternatively, the video system 110 may synchronize the receipt of the query, the video data, and the location data. Synchronization may optimize the relevance and precision of event detection, may reduce latency, and may enhance responsiveness of the video system 110 to dynamic driving scenarios.

As further shown in FIG. 1A, and by reference number 130, the video system 110 may generate a prompt requesting captions of video frames included in the video data. For example, in order to obtain captions (e.g., textual descriptions) of the video frames included in the video data, the video system 110 may generate a specifically-crafted prompt that causes an LLM (e.g., a large multimodal model (LMM)) to provide thorough and extensive descriptions of scenes in the video frames. In some implementations, the prompt may be general enough to work for all different types of driving scenes, but may enable the LLM to identify specific details associated with the query. For example, the video system 110 may generate the following prompt: "Describe the scene and the subject vehicle. Make a list of the visible vehicles and other subjects like people or animals, if present. Describe the location and road type. In which part of the road layout is the subject vehicle?What is the weather?"

Alternatively, instead of generating the prompt, the video system 110 may utilize another LLM (e.g., a Llama model, a generative pretrained transformer (GPT) model, and/or the like) to generate a specialized prompt based on the query. The video system 110 may provide the query to the other LLM with a request to generate a prompt based on the query. The other LLM may generate the prompt based on the query and the request (e.g., by combining and summarizing large texts and extracting the most important parts). This may enable a further customization of the experience for the user.

As further shown in FIG. 1A, and by reference number 135, the video system 110 may receive a dictionary (W) of words. For example, the video system 110 may receive and utilize a dynamic word library (e.g., the dictionary of words) that updates based on frequent queries and common terminologies observed in user interactions. A dynamic library that continually evolves may maintain the relevance and accuracy of the video system 110 in interpreting queries, and may provide an adaptive and learning-oriented approach to event detection and categorization.

In some implementations, the dictionary of words may include a curated subset of the English dictionary related to the specific domain of driving events. The dictionary of words may be associated with categories, such as a subject (S), an action (A), an object (O), a place or time (P), a characteristic (Ch), and/or the like, and each category may include words specific to driving events. In one example, the dictionary of words may include the information included in the following table.

| Category | Subject (S) | Actions (A) | Objects (O) | Places/Times (P) | Characteristics (Ch) |
|---|---|---|---|---|---|
| Words | Vehicle description:<br>Truck<br>Van<br>Car<br>Bike<br>Police<br>Ambulance<br>Animal<br>Pedestrian<br>Collision<br>Near-miss<br>Road signs:<br>Traffic light<br>Stop Sign<br>Yield sign | Collide<br>Avoid<br>Swerve<br>Cross<br>Walk<br>Run<br>Go<br>Move<br>Slide<br>Turn<br>Head<br>Run<br>Cut | Vehicle description:<br>Truck<br>Van<br>Car<br>Bike<br>Police<br>Ambulance<br>Animal<br>Pedestrian<br>Collision<br>Near-miss<br>Road signs:<br>Traffic light<br>Stop Sign<br>Yield sign | Building description:<br>Skyscraper<br>Residential building<br>Industrial building<br>House<br>Gas station<br>Deposit<br>Church<br>Hospital<br>School<br>Road type description:<br>Urban<br>Extra urban<br>Dirt<br>Rural<br>Ancient<br>Country<br>Mountain<br>Sea<br>City<br>Fields<br>Park<br>Day<br>Night<br>Evening<br>Dawn<br>Morning<br>Afternoon | Colors<br>Weather conditions:<br>Sunny<br>Rainy<br>Snowy<br>Foggy<br>Cloudy<br>Stormy |

As shown in FIG. 1B, and by reference number 140, the video system 110 may process the video data, with an LLM and based on the prompt, to generate the captions (C) of the video frames included in the video data. For example, the video system 110 may provide the video data and the prompt to an LLM system that includes the LLM. Alternatively, the video system 110 may include the LLM and may process the video data with the LLM and based on the prompt. The LLM may process the video data based on the prompt, and may generate the captions of the video frames included in the video data. For example, the prompt may include the following text noted above: "Describe the scene and the subject vehicle. Make a list of the visible vehicles and other subjects like people or animals, if present. Describe the location and road type. In which part of the road layout is the subject vehicle? What is the weather?" For such a prompt, the LLM may return the following caption of the scene in a video frame: "This is a road scene recorded from the subject which is a black truck. There is a crossroad with traffic lights and four other cars are crossing the road from right to left. The other vehicles involved are one red car, one white van, and two black cars. The subject vehicle is stopped at the cross-road stop line. The weather is sunny."

The video system 110 may utilize the LLM to analyze each video frame and produce a textual description (e.g., a caption) that comprehensively captures the scene depicted in each video frame. In some implementations, a caption generated for each video frame may depend on information provided in the prompt. For example, a more general prompt might result in a broader description of a video frame, whereas a highly specific prompt may instruct the LLM to provide a detailed narrative on specific visual elements or actions taking place within a video frame. Additionally, or alternatively, the video system 110 may dynamically adjust or personalize the prompt provided to the LLM based on historical queries provided by the user. Such a personalized approach may ensure that the generated captions are more relevant and aligned with the user's specific interests and previous interactions with the video system 110. By learning from historical data, the video system 110 may refine prompt strategies to effectively tailor the LLM's output to the user's distinct requirements.

In some implementations, the video system 110 may utilize image recognition technologies (e.g., a computer vision model) to complement the captions generated by the LLM. Integrating image processing capabilities may provide a layered approach to caption generation, adding another dimension of analysis by leveraging visual feature recognition in conjunction with textual description. This may enrich the overall context of the captions, allowing for a more detailed and accurate depiction of video frames. Additionally, or alternatively, the video system 110 may incorporate metadata, such as timestamps or geo-location tags, into the video data. This supplemental information may provide the LLM with additional context, and may enable the LLM to generate more accurate and connective captions that reflect the temporal and spatial aspects of the video data. Additionally, the video system 110 may tag the captions with confidence scores indicating a certainty level of the LLM for each generated caption. These scores may be useful during the matching process (e.g., described below) to prioritize or filter captions, ensuring that the most reliable and relevant captions are matched to queries.

Figure 1C:
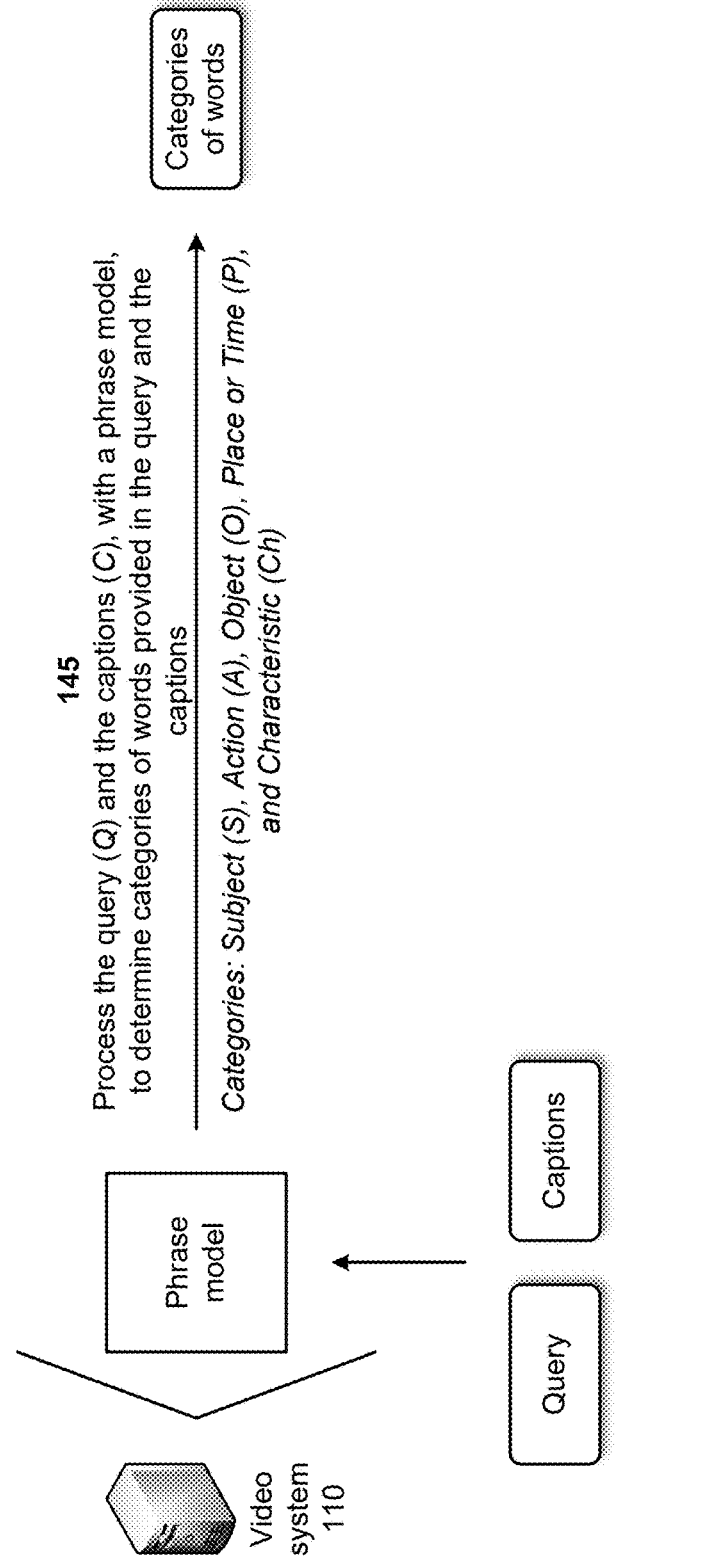

As shown in FIG. 1C, and by reference number 145, the video system 110 may process the query (Q) and the captions (C), with a phrase model, to determine categories of words provided in the query and the captions. For example, the video system 110 may be associated with a machine learning model (e.g., a phrase model) that determines the categories of the words provided in the query and the captions. The phrase model may conduct a clause analysis on both the query and the captions to effectively categorize each word in the query and the captions according to predefined categories, such as a subject category, an action category, an object category, a place or time category, a characteristic category, and/or the like. The segmentation of the words of the query and the captions into distinct word categories may provide an efficient and targeted matching process between the query and the visually descriptive elements present in the video frames.

Each word that is not assigned to a category (e.g., articles, prepositions, and stop words) may be deemed irrelevant and removed in this process. This separation of the words into categories may enable the video system 110 to quantify matching between the query and the captions, and to avoid mixing up subjects with objects, which would lead to incorrect matchings. The characteristic category may be a special category, since these words cannot exist by themselves and are associated with words associated with the subject category, the object category, or the place or time category. English grammar rules may be utilized to assign a characteristic to a word because adjectives may be placed before the word they are referencing.

In one example, if the query includes the text "A blue truck hitting a white van at an intersection," the phrase model may parse the query to identify the subject as "A truck," the action as "hitting," the object as "a van," the place or time as "at an intersection," and the characteristic as "blue-white." If the caption includes the text "The subject is driving down the main street of a small town on a sunny day. A white car is parked on the right, in a parking lot. There is a white church to the left of the frame," the phrase model may parse the caption to identify the subject as "The subject—A car—a white church," the action as "is driving—is parked—There is," the place or time as "down the main street of a small town—on the right, in a parking lot—to the left of the frame—day," and the characteristic as "on a sunny—white."

The phrase model may generate two sets of words (e.g., a first set of words associated with the query and a second set of words associated with the captions) classified with the categories. In some implementations, the phrase model may process the query and the captions to generate dynamic categorization for the words provided in the query and the captions based on context or relevance to the query. For example, instead of utilizing a predefined set of categories, the phrase model may adapt the categorization strategy dynamically, dependent upon the specificity and context of the query, ensuring a more accurate and context-aware categorization. This flexibility enables the video system 110 to interpret and categorize words in a way that is most pertinent to the query. For instance, words might be categorized differently when a query involves a traffic incident versus a query about vehicle maintenance.

Additionally, or alternatively, the phrase model may utilize additional linguistic analysis methods beyond clause analysis, such as semantic role labeling or dependency parsing, to enhance word categorization. These advanced techniques may provide a deeper understanding of the linguistic structure of both the query and the captions, recognizing relationships between words and phrases that might be vital for an accurate depiction of the events sought by the user. Additionally, or alternatively, the categorization process may also include tagging words with parts of speech or other grammatical features to further refine the matching process described below. This may provide an additional layer of analysis whereby words are not only categorized by their semantic role but also by their grammatical function.

By organizing text information into distinct categories, the phrase model simplifies the matching process described below, and improves an accuracy and efficiency of event detection based on queries. The phrase model provides a more nuanced understanding of language in the context of the video data, leading to enhanced user customization, as well as the potential for improved safety and monitoring capabilities in vehicular environments.

Figure 1D:
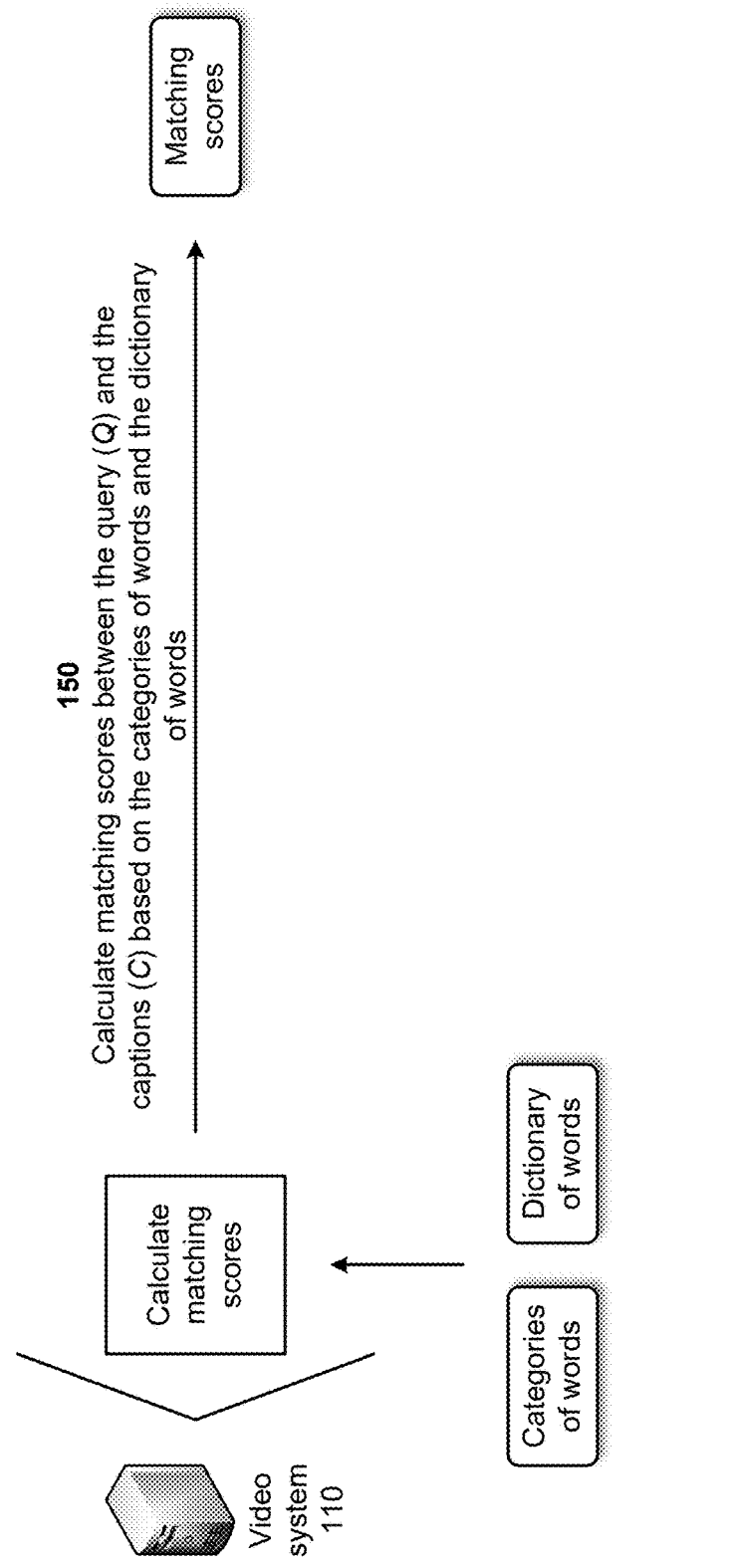

As shown in FIG. 1D, and by reference number 150, the video system 110 may calculate matching scores between the query (Q) and the captions (C) based on the categories of words and the dictionary of words. For example, the video system 110 may calculate a matching score ($M_{QC}$) between the query (Q) and a caption (C) as follows:

$$M_{QC}=S_{QC}+O_{QC}+A_{QC}+w_p{*}P_{QC},$$

where $0.5<w_p<1$ is a coefficient that can be tuned and may control an importance of P words in the overall matching, and the other variables are defined below.

A matching score for a single word may be defined as:

$$m_{QC}(w)=1_Q(w){*}1_C(w),$$

where $1_Q(w)$ is one if the word w has been found in the query Q and zero otherwise, and $1_C(w)$ is one if the word w has been found in the caption C and zero otherwise. The matching score $m_{QC}(w)$ may be one if the word w is in both the query Q and the caption C. The sub-scores of the matching score may be defined as follows:

$$S_{QC}=(\Sigma_{w\in S}m_{QC}(w))/(\Sigma_{w\in S}1_Q(w)){*}(\Sigma_{w\in Ch_S}m_{QC}(w))/\Sigma_{w\in Ch_S}1_Q(w)),$$

$$Q_{QC}=(\Sigma_{w\in W\cap O}m_{QC}(w))/(\Sigma_{w\in O}1_Q(w)){*}(\Sigma_{w\in Ch_O}m_{QC}(w))/\Sigma_{w\in Ch_O}1_Q(w)),$$

$$A_{QC}=(\Sigma_{w\in A}m_{QC}(w))/(\Sigma_{w\in A}1_Q(w)), \text{ and}$$

$$P_{QC}=(\Sigma_{w\in P}m_{QC}(w))/(\Sigma_{w\in P}1_Q(w)){*}(\Sigma_{w\in Ch_P}m_{QC}(w))/\Sigma_{w\in Ch_P}1_Q(w)),$$

Additionally, or alternatively, the video system 110 may refine the calculated matching scores based on historical event data. Patterns and trends discerned from past events may influence the scoring method, may provide foresight, and may facilitate proactive measures. Additionally, or alternatively, the video system 110 may utilize advanced natural language understanding techniques when calculating the matching scores. By discerning context and semantics in word usage, the video system 110 may more accurately interpret intent behind the query and the captions, leading to more meaningful matching outcomes.

Figure 1E:
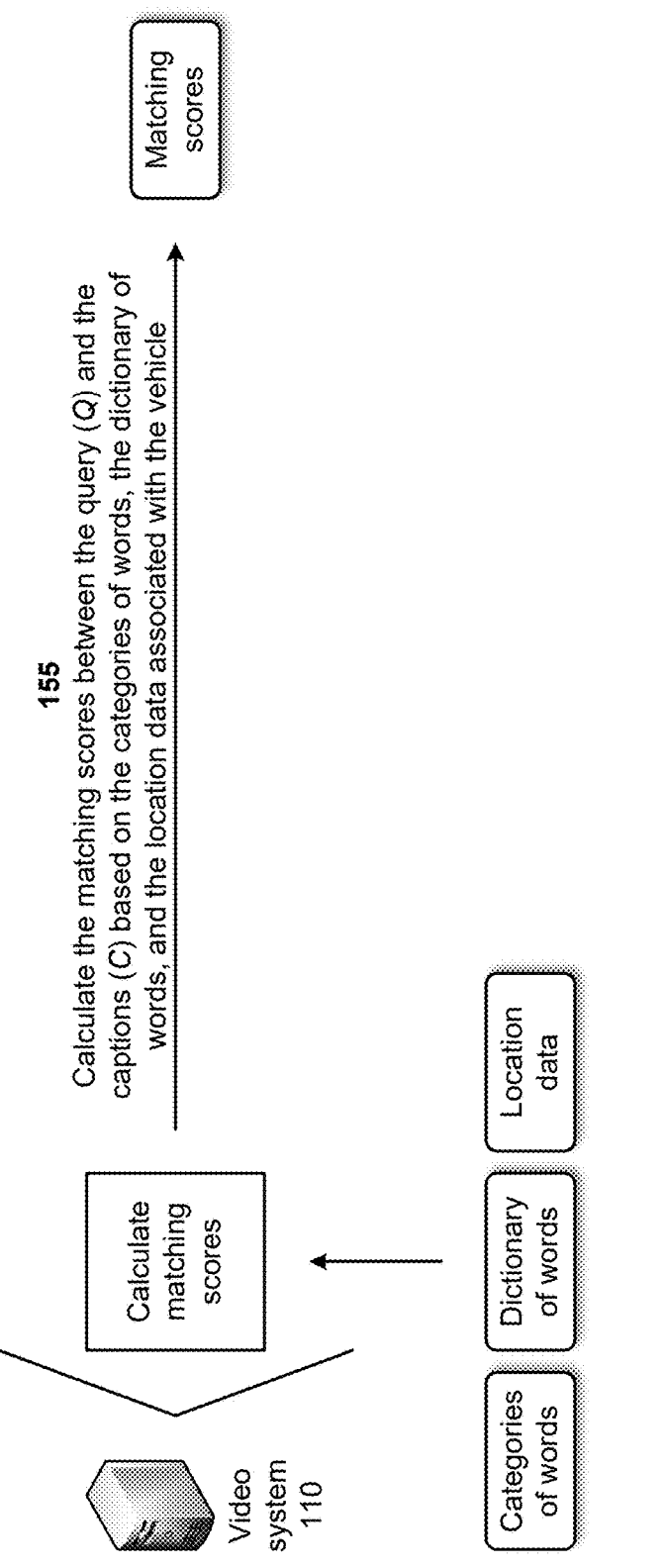

As shown in FIG. 1E, and by reference number 155, the video system 110 may calculate the matching scores between the query (Q) and the captions (C) based on the categories of words, the dictionary of words, and the location data associated with the vehicle. For example, if the query refers to a place, the video system 110 may augment the matching scores calculation based on the location data and maps. As an example, if the query refers to a church, the video system 110, with the aid of a map application, may identify a closest church from a current location of the vehicle. If a distance between the church and the current location is below a threshold value (e.g., fifty meters), the video system 110 may boost the matching score.

The location data and the maps may enable the video system 110 to consider video frames that fail to explicitly capture the place (e.g., and would not be mentioned in the caption but would still be relevant for the query). Given a distance $d_P$ of a location point $\phi$ to a closest matching place, the video system 110 may determine whether the distance is below the threshold value as follows:

$$GPS_{QC}^{map} = 1_{50} \cdot \left(1 - \frac{d_P}{50}\right),$$

where $1_{50}=\{$one if $d_P<50$; zero else$\}$. The less the distance to a matching point is than the threshold value (e.g., fifty meters), the higher the matching score. Furthermore, if places described in the query cannot be explicitly found on maps (e.g., a bumpy road, a red house, and/or the like), the video system 110 may create a database of such places and locations from past events in order to enrich a map search for future queries.

With a database of location points $\sigma$ each associated with a past event, and a location of a current event $\phi$, the video system 110 may collect a quantity ($m_\phi$) of past events that happened within a radius of a threshold value from $\phi$. Furthermore, when there is a match of at least two words of the object category, the place or time category, or the characteristic category between a current query and a prior caption or query of past events $m_\phi$, a quantity of events that match at least two words may be referred to as no. Therefore, the video system 110 may calculate the following:

$$GPS_{QC}^{DB}=\log_{10}(1+n_\phi).$$

The video system 110 may utilize a log in order to gradually decrease an influence of a quantity of events; otherwise, locations with many events may constantly generate a trigger. Finally, the video system 110 may calculate the following:

$$GPS_{QC} = GPS_{QC}^{map} + GPS_{QC}^{DB} = 1_{50} \cdot \left(1 - \frac{d_P}{50}\right) + \log_{10}(1 + n_\phi).$$

This may contribute to a final matching score of an event as follows:

$$M_{QC}=S_{QC}+O_{QC}+A_{QC}+w_P{}^*P_{QC}+GPS_{QC}.$$

In some implementations, calculating the matching scores between the query and the captions may include the video system 110 adjusting initial matching scores based on the location data. The video system 110 may calculate the initial matching scores based on the categories of words and the dictionary of words, and may refine the initial matching scores based on the location data and to generate the matching scores. This spatial context may be intrinsic to identifying events accurately, especially in cases where the query is related to location-specific incidents. Additionally, or alternatively, the video system 110 may utilize alternative data sources, such as onboard vehicle sensors or third-party applications, to enhance the location data and matching score calculations. Incorporating varied data streams may augment location awareness and enrich the data considered during the calculation of the matching scores.

The matching scores provide an effective comparison between the words of the query content and the words of the video frame captions. The matching scores may serve as a basis for identifying events correlated to the vehicle and the query. The video system 110 may provide personalized event detection through sophisticated word categorization and context-aware score calculation in real-time, leading to reduced false positives and increased relevance of detected events for users.

Figure 1F:
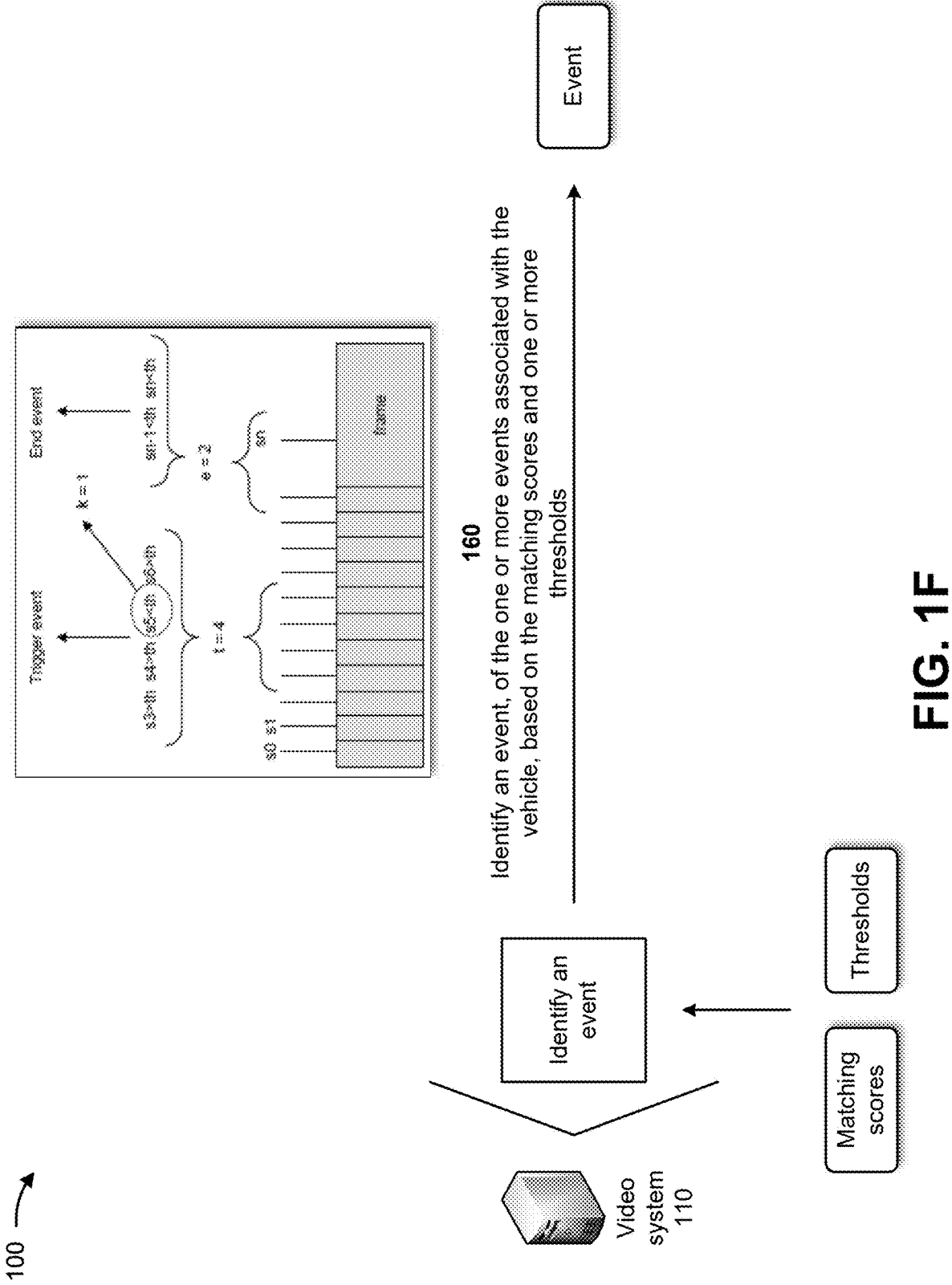

As shown in FIG. 1F, and by reference number 160, the video system 110 may identify an event, of the one or more events associated with the vehicle, based on the matching scores and one or more thresholds. For example, the video system 110 may compare the matching scores with one or more thresholds associated with identifying an event, and may identify the event, from the one or more events associated with the vehicle, based on comparing the matching scores with the one or more thresholds. Given a set of matching scores ($M_{QC}$) (e.g., with a matching score for each of the video frames), the video system 110 may determine a duration of the event being triggered based on the thresholds. The video system 110 may define a first parameter (t) that represents a quantity of consecutive video frames that are greater than a threshold for the event to be triggered, and a second parameter (e) that represents a quantity of consecutive video frames that are less than the threshold for the event to cease. Alternatively, the video system 110 may utilize a single parameter both for triggering and ending the event. In some implementations, in order to be resilient to outliers (e.g., where one or more video frames are incorrectly associated with a matching score very different from other video frames), the video system 110 may utilize a tolerance parameter (k) to specify a quantity of video frames that are less than the threshold in the case of triggering.

The video system 110 may utilize both the matching scores and the one or more thresholds to identify relevant events. Each threshold may serve as a parameter to determine a significance of a match, potentially using historical data or other sets of criteria to fine-tune the event identification. For example, an event may be positively identified if the matching score exceeds a certain threshold, exhibiting a statistically significant correlation between the query and the captions.

As shown in FIG. 1G, and by reference number 165, the video system 110 may perform one or more actions based on the event. In some implementations, performing the one or more actions includes the video system 110 providing, for display, the query and the video data associated with the event. For example, the video system 110 may provide the query and the video data associated with the event to a user device associated with a driver of the vehicle or a fleet manager of the vehicle. The user device may display the query and the video data associated with the event to the driver and/or the fleet manager. This may provide real-time or post-event visual feedback, which can be crucial for drivers or fleet managers to understand the context and severity of the event. Additionally, or alternatively, the video system 110 may store the query and the video data associated with the event for later analysis or review. This may facilitate long-term trend assessment and proactive safety measures by accumulating and analyzing event data over time to observe patterns and implement preventative strategies. In this way, the video system 110 conserves computing resources, networking resources, and/or other resources that would have otherwise been consumed by failing to enable customization of driving events that trigger vehicle video data capture.

In some implementations, performing the one or more actions includes the video system 110 generating and providing a report identifying the event to a driver of the vehicle. For example, the video system 110 may generate and provide a report identifying the event to a driver of the vehicle and/or to a fleet manager of the vehicle. Such a report may serve as a valuable tool for driver feedback and awareness, highlighting areas where driving behavior might need improvement. The report may also include recommendations for corrective actions or safety measures, which may ensure that the driver is not only informed about the event but is also provided with actionable guidance to mitigate future risks specific to the event. In this way, the video system 110 conserves computing resources, networking resources, and/or other resources that would have otherwise been consumed by failing to identify poor drivers based on failing to enable customization of driving events that trigger vehicle video data capture.

In some implementations, performing the one or more actions includes the video system 110 scheduling a driver of the vehicle for driver education based on the event. For example, the video system 110 can schedule a driver of the vehicle for driver education based on the event in order to emphasize the educational and preventative aspects of the video system 110, using the event as a means to enhance driver safety and competence. Additionally, or alternatively, the driver education may include customized training modules to ensure that the training is directly relevant to identified risk areas, further optimizing the educational intervention for maximum impact and safety improvement. In this way, the video system 110 conserves computing resources, networking resources, and/or other resources that would have otherwise been consumed by failing to identify poor drivers based on failing to enable customization of driving events that trigger vehicle video data capture.

In some implementations, performing the one or more actions includes the video system 110 generating and providing an alert identifying the query and the event to a fleet manager of the vehicle. For example, the video system 110 may generate and provide the alert to a user device of the fleet manager, and the user device may provide the alert to the fleet manager. Such alerts may facilitate fleet management, ensuring that appropriate actions are taken in response to safety-critical events, potentially influencing driver training programs or operational protocols. Additionally, or alternatively, such alerts may be integrated into a broader fleet safety management system, in which case the system may trigger automatic workflows or protocols in response to specific event categories, streamlining the response to incidents and bolstering overall fleet safety measures. In this way, the video system 110 conserves computing resources, networking resources, and/or other resources that would have otherwise been consumed by capturing and storing vehicle video data that is useless to a user (e.g., a fleet manager).

In some implementations, performing the one or more actions includes the video system 110 retraining the phrase model based on the event. For example, the video system 110 may utilize the event as additional training data for retraining the phrase model, thereby increasing the quantity of training data available for training the phrase model. Accordingly, the video system 110 may conserve computing resources associated with identifying, obtaining, and/or generating historical data for training the phrase model, relative to other systems for identifying, obtaining, and/or generating historical data for training machine learning models.

In this way, the video system provides query-based triggers in real-time videos associated with a vehicle. For example, the video system may receive a free-text query specifying particular event criteria, video data from a camera associated with a vehicle, and geolocational data contextual to the video data. The video system may generate prompts that solicit captions for video frames of the video data from an LLM, and may categorize words from the query and the captions. The video system may calculate matching scores between the query and the captions based on the categories and a predefined dictionary, may identify an event when the matching scores surpass certain thresholds, and execute predetermined actions relevant to the identified event. By delivering a customizable triggering mechanism for dash-cam events based on dynamic, free-text queries, the video system mitigates the resource usage associated with constantly retraining AI models for new event types. Thus, the video system may conserve computing resources, networking resources, and/or other resources that would have otherwise been consumed by failing to enable customization of driving events that trigger vehicle video data capture, capturing and storing vehicle video data that is useless to a user (e.g., a fleet manager), failing to identify poor drivers based on failing to enable customization of driving events that trigger vehicle video data capture, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
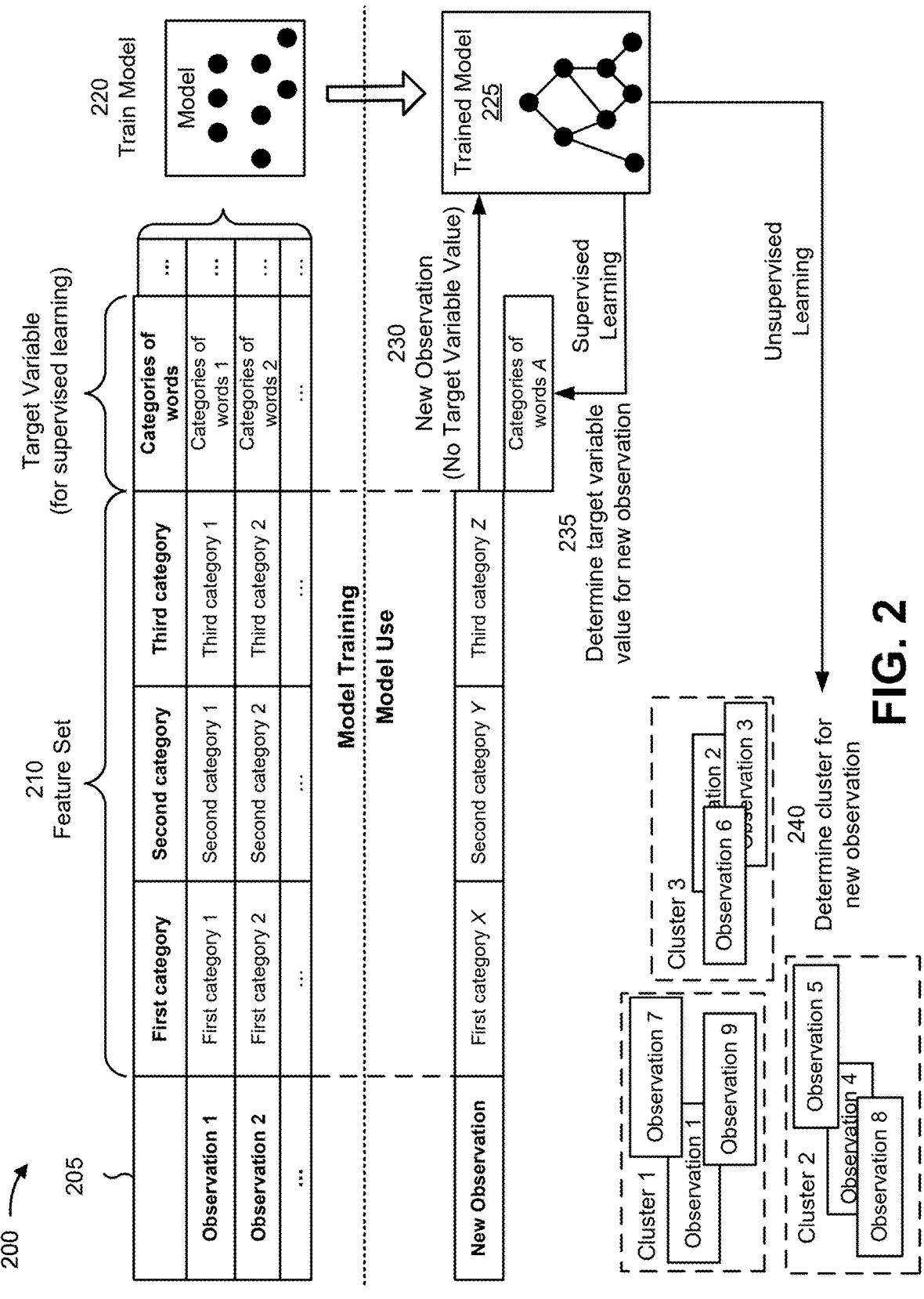
FIG. 2 is a diagram illustrating an example of training and using a machine learning model.

FIG. 2 is a diagram illustrating an example 200 of training and using a machine learning model for generating categories of words based on a query and captions. The machine learning model training and usage described herein may be performed using a machine learning system. The machine learning system may include or may be included in a computing device, a server, a cloud computing environment, and/or the like, such as the video system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the video system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a first category, a second feature of a second category, a third feature of a third category, and so on. As shown, for a first observation, the first feature may have a value of first category 1, the second feature may have a value of second category 1, the third feature may have a value of third category 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "categories of words" and may include a value of categories of words 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of first category X, a second feature of second category Y, a third feature of third category Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of categories of words A for the target variable of the categories of words for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first category cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a second category cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to generate categories of words based on a query and captions. The machine learning system enables recognition and/or identification of tens, hundreds, thousands, or millions of features and/or feature values for tens, hundreds, thousands, or millions of observations, thereby increasing accuracy and consistency and reducing delay associated with generating categories of words based on a query and captions relative to requiring computing resources to be allocated for tens, hundreds, or thousands of operators to manually generate categories of words based on a query and captions.

As indicated above, FIG. 2 is provided as an example. Other examples may differ from what is described in connection with FIG. 2.

Figure 3:
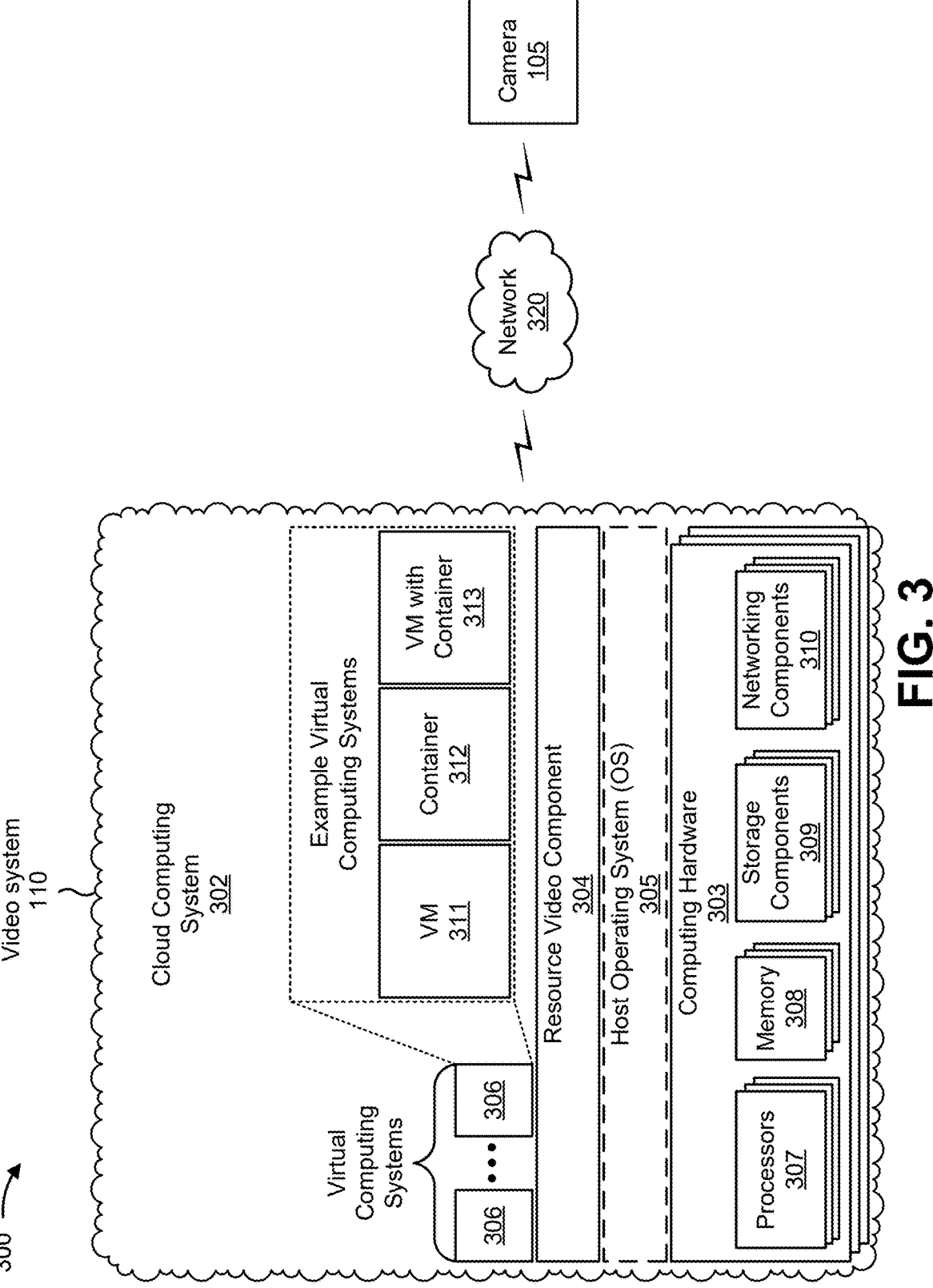
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the video system 110, which may include one or more elements of and/or may execute within a cloud computing system 302. The cloud computing system 302 may include one or more elements 303-313, as described in more detail below. As further shown in FIG. 3, the environment 300 may include the camera 105 and/or a network 320. Devices and/or elements of the environment 300 may interconnect via wired connections and/or wireless connections.

The camera 105 may include one or more devices capable of receiving, generating, storing, processing, providing, and/or routing information, as described elsewhere herein. The camera 105 may include a communication device and/or a computing device. For example, the camera 105 may include an optical instrument that captures videos (e.g., images and audio). The camera 105 may feed real-time video directly to a screen or a computing device for immediate observation, may record the captured video (e.g., images and audio) to a storage device for archiving or further processing, and/or the like. In some implementations, the camera 105 may include a dashcam of a vehicle, a forward-facing camera of a vehicle, a driver-facing camera of a vehicle, a side camera of a vehicle, a rear camera of a vehicle, and/or the like.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 110 may include one or more elements 303-313 of the cloud computing system 302, may execute within the cloud computing system 302, and/or may be hosted within the cloud computing system 302, in some implementations, the video system 110 may not be cloud-based (e.g., may be implemented outside of a cloud computing system) or may be partially cloud-based. For example, the video system 110 may include one or more devices that are not part of the cloud computing system 302, such as a device 400 of FIG. 4, which may include a standalone server or another type of computing device. The video system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
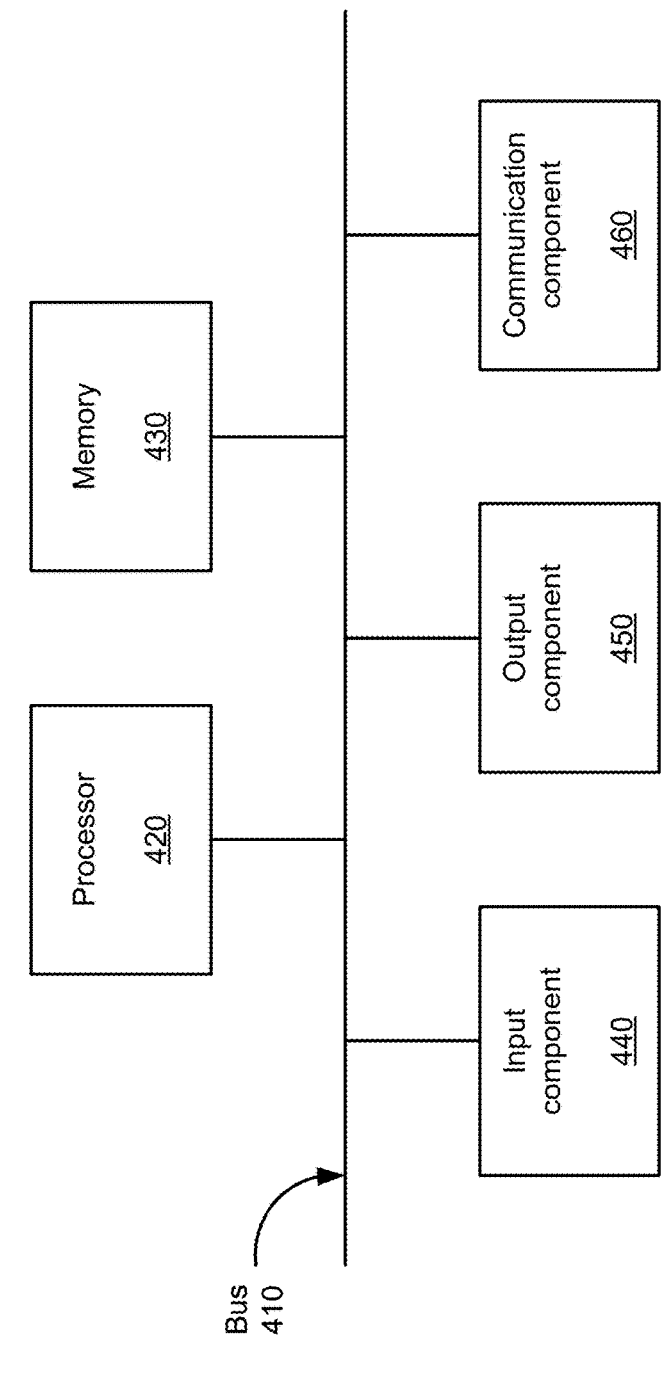
FIG. 4 is a diagram of example components of one or more devices of FIG. 3.

FIG. 4 is a diagram of example components of a device 400, which may correspond to the camera 105 and/or the video system 110. In some implementations, the camera 105 and/or the video system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 depicts a flowchart of an example process 500 for providing query-based triggers in real-time videos associated with a vehicle. In some implementations, one or more process blocks of FIG. 5 may be performed by a device (e.g., the video system 110). In some implementations, one or more process blocks of FIG. 5 may be performed by another device or a group of devices separate from or including the device, such as a control system of the vehicle, a camera (e.g., one of the cameras 105), and/or the like. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving a query identifying one or more events to be captured by a camera associated with a vehicle, video data associated with the vehicle, and location data associated with the vehicle (block 510). For example, the device may receive a query identifying one or more events to be captured by a camera associated with a vehicle, video data associated with the vehicle, and location data associated with the vehicle, as described above. In some implementations, the query is a free-text query received by the camera associated with the vehicle. In some implementations, the query includes a structured sentence or a list of keywords. In some implementations, receiving the location data associated with the vehicle includes utilizing a map application to identify the location data associated with one or more places identified in the query.

As further shown in FIG. 5, process 500 may include generating a prompt requesting captions of video frames included in the video data (block 520). For example, the device may generate a prompt requesting captions of video frames included in the video data, as described above. In some implementations, generating the prompt requesting the captions of the video frames included in the video data includes processing the query, with another large language model, to generate the prompt requesting the captions of the video frames included in the video data.

As further shown in FIG. 5, process 500 may include processing the video data, with a large language model and based on the prompt, to generate the captions of the video frames included in the video data (block 530). For example, the device may process the video data, with a large language model and based on the prompt, to generate the captions of the video frames included in the video data, as described above.

As further shown in FIG. 5, process 500 may include processing the query and the captions, with a phrase model, to determine categories of words provided in the query and the captions (block 540). For example, the device may process the query and the captions, with a phrase model, to determine categories of words provided in the query and the captions, as described above. In some implementations, the categories of words include one or more of a subject category, an action category, an object category, a place or time category, or a characteristic category.

As further shown in FIG. 5, process 500 may include calculating matching scores between the query and the captions based on the categories of words and a dictionary of words (block 550). For example, the device may calculate matching scores between the query and the captions based on the categories of words and a dictionary of words, as described above. In some implementations, calculating the matching scores between the query and the captions includes calculating the matching scores between the query and the captions based on the categories of words, the dictionary of words, and the location data associated with the vehicle. In some implementations, calculating the matching scores between the query and the captions based on the categories of words, the dictionary of words, and the location data includes calculating initial matching scores between the query and the captions based on the categories of words and the dictionary of words, and adjusting the initial matching scores based on the location data and to generate the matching scores between the query and the captions.

In some implementations, calculating the matching scores between the query and the captions based on the categories of words and the dictionary of words includes analyzing each word in the query and the captions for categorization into one or more of subjects, actions, objects, places or times, or characteristics, and calculating the matching scores between the query and the captions based on analyzing each word in the query and the captions for categorization. In some implementations, calculating the matching scores between the query and the captions based on the categories of words and the dictionary of words includes utilizing the dictionary of words to control a scope of words used to calculate the matching scores between the query and the captions.

As further shown in FIG. 5, process 500 may include identifying an event, of the one or more events associated with the vehicle, based on the matching scores and one or more thresholds (block 560). For example, the device may identify an event, of the one or more events associated with the vehicle, based on the matching scores and one or more thresholds, as described above.

As further shown in FIG. 5, process 500 may include performing one or more actions based on the event (block 570). For example, the device may perform one or more actions based on the event, as described above. In some implementations, performing the one or more actions includes one or more of providing, for display, the query and the video data associated with the event, providing a report identifying the event to a driver of the vehicle, or scheduling a driver of the vehicle for driver education based on the event. In some implementations, performing the one or more actions includes one or more of providing an alert identifying the query and the event to a fleet manager of the vehicle, or retraining the phrase model based on the event.

In some implementations, process 500 includes adjusting the matching scores based on a function associated with historical event data being within distances of the one or more events.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a query identifying one or more events to be captured by a camera of a vehicle, video data generated by the camera of the vehicle, and location data associated with the vehicle;
   generating, by the device, a prompt requesting captions of video frames included in the video data;
   processing, by the device, the video data, with a large language model and based on the prompt, to generate the captions of the video frames included in the video data;
   processing, by the device, the query and the captions, with a phrase model, to determine categories of words provided in the query and the captions;
   calculating, by the device, matching scores between the query and the captions based on the categories of words and a dictionary of words associated with driving events;
   identifying, by the device, an event, of the one or more events associated with the vehicle, based on the matching scores and one or more thresholds; and
   performing, by the device, one or more actions based on the event, the one or more actions including one or more of:

providing an alert identifying the event to a driver of the vehicle;

providing a report identifying the event to a fleet manager of the vehicle; or providing the video data associated with the event for display by the device.

2. The method of claim 1, wherein calculating the matching scores between the query and the captions comprises:

calculating the matching scores between the query and the captions based on the categories of words, the dictionary of words, and the location data associated with the vehicle.

3. The method of claim 2, wherein calculating the matching scores between the query and the captions based on the categories of words, the dictionary of words, and the location data comprises:

calculating initial matching scores between the query and the captions based on the categories of words and the dictionary of words; and adjusting the initial matching scores based on the location data and to generate the matching scores between the query and the captions.

4. The method of claim 1, wherein the query is a free-text query received by the camera associated with the vehicle.

5. The method of claim 1, wherein the query includes a structured sentence or a list of keywords.

6. The method of claim 1, wherein the categories of words include one or more of a subject category, an action category, an object category, a place or time category, or a characteristic category.

7. The method of claim 1, wherein generating the prompt requesting the captions of the video frames included in the video data comprises:

processing the query, with another large language model, to generate the prompt requesting the captions of the video frames included in the video data.

8. A device, comprising:

one or more processors configured to:

receive a query identifying one or more events to be captured by a camera of a vehicle, video data generated by the camera of the vehicle, and location data associated with the vehicle, wherein the query is a free-text query received by the camera associated with the vehicle;

generate a prompt requesting captions of video frames included in the video data;

process the video data, with a large language model and based on the prompt, to generate the captions of the video frames included in the video data;

process the query and the captions, with a phrase model, to determine categories of words provided in the query and the captions;

calculate matching scores between the query and the captions based on the categories of words and a dictionary of words associated with driving events;

identify an event, of the one or more events associated with the vehicle, based on the matching scores and one or more thresholds; and perform one or more actions based on the event, wherein the one or more processors, to perform the one or more actions, are configured to one or more of:

provide an alert identifying the event to a driver of the vehicle;

provide a report identifying the event to a fleet manager of the vehicle; or provide the video data associated with the event for display by the device.

9. The device of claim 8, wherein the one or more processors, to receive the location data associated with the vehicle, are configured to:

utilize a map application to identify the location data associated with one or more places identified in the query.

10. The device of claim 8, wherein the one or more processors are further configured to:

adjust the matching scores based on a function associated with historical event data being within distances of the one or more events.

11. The device of claim 8, wherein the one or more processors, calculate the matching scores between the query and the captions based on the categories of words and the dictionary of words, are configured to:

analyze each word in the query and the captions for categorization into one or more of subjects, actions, objects, places or times, or characteristics; and calculate the matching scores between the query and the captions based on analyzing each word in the query and the captions for categorization.

12. The device of claim 8, wherein the one or more processors, to calculate the matching scores between the query and the captions based on the categories of words and the dictionary of words, are configured to:

utilize the dictionary of words to control a scope of words used to calculate the matching scores between the query and the captions.

13. The device of claim 8, wherein the one or more processors, to perform the one or more actions, are configured to:

retrain the phrase model based on the event.

14. A non-transitory computer-readable medium storing a set of instructions, the set of instructions comprising:

one or more instructions that, when executed by one or more processors of a device, cause the device to:

receive a query identifying one or more events to be captured by a camera of a vehicle, video data generated by the camera of the vehicle, and location data associated with the vehicle, wherein the query includes a structured sentence or a list of keywords;

generate a prompt requesting captions of video frames included in the video data;

process the video data, with a large language model and based on the prompt, to generate the captions of the video frames included in the video data;

process the query and the captions, with a phrase model, to determine categories of words provided in the query and the captions;

calculate matching scores between the query and the captions based on the categories of words, a dictionary of words associated with driving events, and the location data associated with the vehicle;

identify an event, of the one or more events associated with the vehicle, based on the matching scores and one or more thresholds; and perform one or more actions based on the event, wherein the instructions that cause the device to perform the one or more actions include instructions that cause the device to perform one or more of:

provide an alert identifying the event to a driver of the vehicle;

provide a report identifying the event to a fleet manager of the vehicle; or provide the video data associated with the event for display by the device.

15. The non-transitory computer-readable medium of claim 14, wherein the one or more instructions, that cause the device to calculate the matching scores between the query and the captions based on the categories of words, the dictionary of words, and the location data, cause the device to:

calculate initial matching scores between the query and the captions based on the categories of words and the dictionary of words; and adjust the initial matching scores based on the location data and to generate the matching scores between the query and the captions.

16. The non-transitory computer-readable medium of claim 14, wherein the one or more instructions, that cause the device to generate the prompt requesting the captions of the video frames included in the video data, cause the device to:

process the query, with another large language model, to generate the prompt requesting the captions of the video frames included in the video data.

17. The non-transitory computer-readable medium of claim 14, wherein the one or more instructions, that cause the device to receive the location data associated with the vehicle, cause the device to:

utilize a map application to identify the location data associated with one or more places identified in the query.

18. The non-transitory computer-readable medium of claim 14, wherein the one or more instructions further cause the device to:

adjust the matching scores based on a function associated with historical event data being within distances of the one or more events.

19. The non-transitory computer-readable medium of claim 14, wherein the one or more instructions, that cause the device to calculate the matching scores between the query and the captions based on the categories of words and the dictionary of words, cause the device to:

utilize the dictionary of words to control a scope of words used to calculate the matching scores between the query and the captions.

20. The method of claim 1, wherein each word of the dictionary of words is associated with a category of the category of words.

* * * * *